United States Patent Office 3,498,680
Patented Mar. 3, 1970

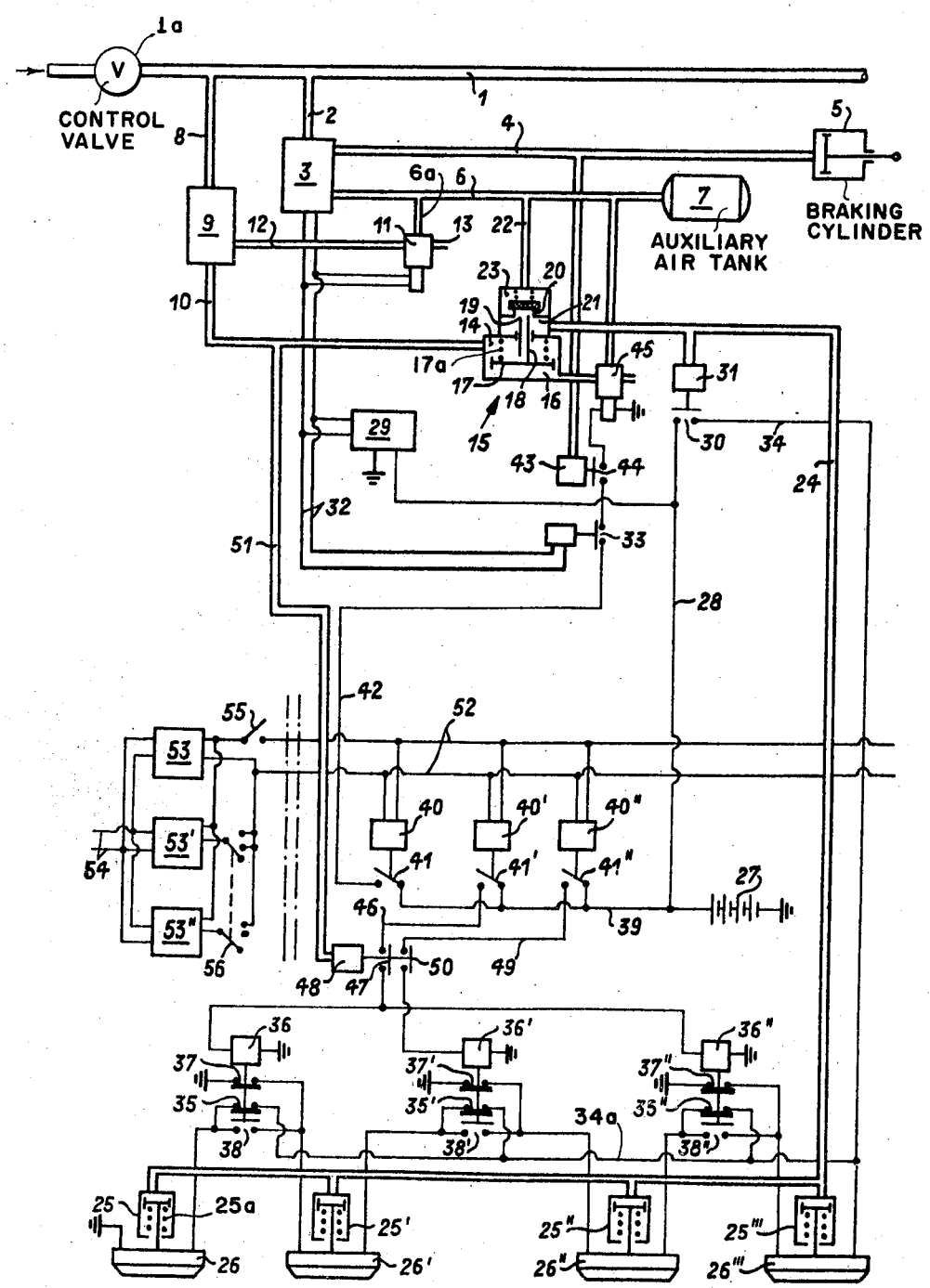

3,498,680
MAGNETIC BRAKING SYSTEM FOR
RAILWAY VEHICLES
Eugen Rittler, Munich, Germany, assignor to Knorr-Bremse G.m.b.H., Munich, Germany, a limited-liability company of Germany
Filed Dec. 26, 1967, Ser. No. 693,493
Claims priority, application Germany, Jan. 3, 1967,
K 61,080
Int. Cl. B60t 13/74
U.S. Cl. 303—3         7 Claims

ABSTRACT OF THE DISCLOSURE

A railway vehicle is provided with both an air braking system and a magnetic rail braking system. The magnetic braking system operates automatically to provide additional braking when the air braking system is operating near its maximum effectiveness. A control apparatus is provided so that the magnetic braking system can exert desired levels of braking force independently of the operation of the air braking system.

---

The present invention relates to railway vehicles equipped with both an air braking system and a magnetic rail braking system, more particularly, to the apparatus for controlling the operation of the magnetic rail braking system.

In railway vehicles equipped with both braking systems, the conventional arrangement is for the magnetic rail braking system to supplement the air braking system only during those braking operations that require the exertion of a particularly large braking force. Such vehicles are generally provided wtih some form of a switching member which will automatically operate the magnetic rail braking system whenever the air braking system is operating close to its maximum effectiveness. In such arrangements it is not possible to operate the magnetic rail braking system independently of the air braking system.

Controlling devices have been proposed which will deenergize the magnetic rail brakes after they have been actuated when the speed of the vehicle decreases below a predetermined level. As a result of thus deenergizing the magnetic rail braking system, the total braking force will be decreased since the air brakes have an increased braking force at low speeds. The stopping effect of the vehicle will be more gradual so as to avoid excessive shocks and jarring of the vehicle during the braking operation.

It has also been proposed to control the degree of energization of the magnetic braking units so as to regulate the braking force exerted by the magnetic braking system. However, merely varying the effectiveness of the magnetic braking system is not satisfactory since the operation of the magnetic braking system must be independent but coordinated with the air braking system.

It is therefore the principal object of the present invention to provide a novel and improved magnetic rail braking system for railway vehicles.

It is another object of the present invention to provide a control arrangement for a magnetic rail braking system which can be switched in or out by the vehicle operator independently of the air braking system.

It is a further object of the present invention to provide a magnetic rail braking system which not only automatically operates when the air braking system reaches a predetermined level of effectiveness but which can be controlled by the vehicle operator independently of the air braking system to exert a predetermined braking force.

The present invention may be incorporated in a railway vehicle equipped with an air braking system and a magnetic rail braking system. Switching means are connected between the air and magnetic braking systems and automatically actuate the magnetic rail braking system in response to a predetermined level of effectiveness of the air braking system. When the air brakes are operating to their maximum level of effectiveness the magnetic braking system will be automatically operated to exert additional braking force. Control means including an electrical circuit are in parallel to the switching means and are operable by the vehicle operator to selectively control the braking force exerted by the rail braking system. The electrical circuit includes relay switches which are actuated in response to output signals generated by various positions of a control unit to connect the several magnetic braking units in series or parallel relationship to regulate the degree of magnetization of these braking units.

Other objects and advantages of the present invention will be apparent upon reference to the accompanying description when taken in conjunction with the drawing which illustrates schematically the air braking system and magnetic rail braking system according to the present invention.

A specific embodiment of the present invention will be described in detail with reference to the drawing.

In the air braking system there is provided an air supply line 1 whose pressure is controlled by the vehicle operator means of a control valve 1a. There is a branch line 2 leading to a brake control valve 3 from which there extends a line 4 leading to a braking cylinder 5. Also extending from valve 3 is a line 6 leading to an auxiliary air reservoir 7. In addition to the above described braking system which is conventional, another branch line 8 extends from the main air supply line 1 to a switching valve 9 which is responsive to pressure drops in the main air supply line 1. When the pressure drops quickly in main line 1 as a result of a sudden or quick braking operation, an air conduit 10 which normally opens to the atmosphere through valve 9 is connected to a conduit 12 leading to a magnetically actuated valve 11 which is connected to line 6 by a conduit 6a. In its deenergized state the magnetic valve 11 is connected to the atmosphere through an outlet conduit 13. When energized, the valve 11 connects conduit 12 to line 6 through line 6a.

The line 10 extends from valve 9 to a cylindrical chamber 14 in a fluid pressure switching device indicated generally at 15. The switching device 15 comprises a piston 17 urged in one direction by a spring 17a and in the other direction by fluid pressure in a second cylindrical chamber 16. The piston 17 comprises a hollow piston rod 18 which is continually open to the cylindrical chamber 14. The upper end of piston rod 18 controls a double valve 19, 20.

In its normal position as illustrated in the drawing, the switching device 15 connects cylindrical chamber 14 through the open valve 19 formed at the end of piston rod 18 with an upper cylindrical chamber 21. When sufficient pressure is introduced into the cylindrical chamber 16, the piston 17 will be urged upwardly against the force of spring 17a and the valve 19 will be closed while the valve 20 will be opened by the upward movement of piston rod 18. As a result of this action the cylindrical chamber 21 will communicate through open valve 20 with a chamber 23 which in turn is continuously supplied with air under pressure through a conduit 22 leading from air line 6.

Extending from switching device 15 and communicating with cylindrical chamber 21 therein, there is a line 24 connected to the actuating or lowering cylinders 25, 25′, 25″, and 25‴, which have piston rods upon which are mounted magnetic rail braking members 26, 26′, 26″, and 26‴. The magnetic rail braking members are held in their raised or inoperative positions as illustrated in the drawings by corresponding springs 25a. When fluid under pressure is introduced to the cylinders through line 24 the magnetic members will be lowered to their operating positions a short distance above the rails.

From a grounded source of electrical energy 27 there extends electrical lead or cable 28 to a speed responsive switch 29 and to switch contacts 30 actuated by a pressure responsive operator 31 connected to air line 24. The switch 29 is responsive to the speed of the railway vehicle and closes the electrical circuit only when the vehicle speed exceeds a predetermined limit. When switch 29 closes, a voltage potential is applied to leads 32 which are connected to magnetic valves 3 and 11, and to the solenoid operator of a relay switch 33. The brake control valve 3 is provided with a known device which will increase the pressure of the braking fluid delivered to the line 4 when a voltage potential is established between the leads 32. It is apparent that this voltage potential will be established at high vehicle speeds (above the predetermined limit) and during the braking operation. The relay switch 33 is normally open and is closed when its solenoid operator is energized as described above under the action of speed responsive switch 39.

The pressure responsive operator 31 closes switch contacts 30 when fluid under pressure is introduced into line 24. Electrical lead 34 leads from switch contacts 30 to the solenoid of the magnetic member 26‴ and is further connected to each of the three normally closed switch contacts, 35, 35′, and 35″ by lead 34a. The switch contacts 35 are in three similar relay switches 36, 36′, and 36″ which are normally deenergized. One side of switch contact 35 is connected only to the ground solenoid of magnetic braking member 26, one side of switch contact 35′ is connected to the solenoid of magnetic braking member 26′ and one side of switch contact 35″ is connected to the solenoid of the third magnetic braking member 26″. The other terminals of the solenoids of the magnetic braking members 26′, 26″, and 26‴ are respectively connected to switch contacts 37, 37′, and 37″ with these contacts being normally closed when the respective relay switches are deenergized. The second terminals of the solenoids of magnetic braking members are also connected to swtich contacts 38, 38′ and 38″ of the respective relay switches and are open when the respective relay switches are deenergized. The other sides of switch contacts 37, 37′, and 37″, are grounded while the other sides of switch contacts 38, 38′, and 38″ are connected to the input terminals of the solenoids of magnetic braking members 26, 26′, and 26″.

Also extending from the source of electrical energy 27, is an electrical conductor 39 connected to switches 41, 41′, and 41″ controlled respectively by operators 40, 40′, and 40″. From the other side of switch 41, there extends a lead 42 to relay switch 33 and across a switch 44 actuated by pressure responsive operator 43 and then to a magnetic valve 45 whose other side is connected to ground. Energization of magnetic valve 45 will connect air line 6 and cylindrical chamber 16 of switching device 15; while in the deenergized condition the valve 45 closes this connection and opens cylindrical chamber 16 to the atmosphere.

The pressure responsive operator 43 is connected to air line 4 so as to be actuated whenever a predetermined average braking pressure is exceeded whereupon switch 44 is closed.

From switch 41′ there extends an electrical lead 46 to one side of a switch 47 actuated by a pressure responsive operator 48 with the other side of switch 47 being connected to relays 36 and 36″.

From switch 41″ an electrical lead 49 is connected to one side of a second switch 50 also actuated by the pressure responsive operator 48 with the other side of the second switch 50 being connected to the solenoid of relay switch 36′. The pressure responsive operator 48 is connected by a conduit 51 to the conduit 10 so that switches 47 and 50 which are normally closed are opened only when fluid pressure is introduced into conduits 10 and 51.

The operators 40, 40′, and 40″ are connected in parallel across control leads 52 which extend through the vehicle. At the operators control stand there are provided transmitters or output signal generators 53, 53′, and 53″ all of which are connected to a source of electrical energy by leads 54. A switch 55 is provided to connect transmitter 53 to control leads 52. A three-step switch 56 is provided to connect or disconnect transmitters 53′ and 53″ to control leads 52 or to connect only transmitter 53′ to leads 52 in parallel to transmitter 53. When only transmitter 53 is connected to control leads 52 the operator 40 will respond to its output signals by closing switch 41. When transmitters 53 and 53′ are connected to control leads 53, operators 40 and 40′ will respond by closing their respective switches 41 and 41′. When all three transmitters 53, 53′, and 53″ transmit their respective output signals to control leads 52, the three operators will respond by closing the switches 41, 41′, and 41″.

OPERATION OF THE BRAKING SYSTEMS

When the air brakes are released and the vehicle is moving, the auxiliary air reservois 7 and cylindrical space 23 of switching device 15 are filled with compressed air under the pressure existing in air supply line 1.

When the speed of the vehicle exceeds a predetermined limit speed responsive switch 29 will be actuated and will energize magnetic valve 11 to connect line 6 with conduit 12. Relay switch 33 will also be closed. There will be no braking pressure in line 4 of braking cylinder 5 and switch 44 will be open. Magnetic valve 45 will be deenergized and accordingly cylindrical chamber 16 of switching device 15 is open to the atmosphere. Valve 9 also maintains conduit 10 open to the atmosphere. Switching device 15 is in the condition as illustrated in the drawings so that line 24 is connected with conduit 10. There is no pressure in the cylinders 25 and the magnetic rail braking members 26 are maintained in their inoperative or raised position. Switch contacts 30 are open and the solenoids of the magnetic rail braking members 26 are not connected to a source of electrical energy. Switches 47 and 50 are normally closed since there is no pressure in the operator 48. The switch 55 is open and there is no output signal in the control leads 52 so that switches 41 are open and the solenoids of relay switches 36 are deenergized with the result that their switch contacts are in the positions as illustrated in the drawing.

For quick braking, the brake control valve 3 will admit maximum braking pressure to braking cylinder 5. Concurrently switch 9 will respond by disconnecting conduit 10 from the atmosphere and by connecting conduit 10 to conduit 12. At high vehicle speeds when the magnetic valve is energized, air under pressure will flow from auxiliary air reservoir 7 across magnetic valve 11, through conduits 12 and 10 into cylindrical chamber 14 and through hollow piston rod 18 into cylindrical chamber 21 and to line 24. The introduction of pressure into line 24 will actuate cylinders 25 and the magnetic members 26 will be lowered to their operative positions immediately above the rails. In response to the pressure in conduit 10, the pressure operator 48 will open switches 47 and 50. In response to pressure in line 24, the pressure responsive operator 31 will close switch contacts 30. The solenoids of the magnetic braking members 26 are thus connected to a source of electrical energy 27 through leads 28 and 34. The magnetic members 26 are connected in parallel through closed contacts 35, 35′ and 35″ and closed contacts 37, and 37', and 37" and as a result are strongly energized.

Should the operator close switch 55 during the quick braking operation as described above, switch 41 will close and, depending on the setting of switch 56, switches 41' and 41" may also close, the closing of switch 41 will energize magnetic valve 45 and cylindrical chamber 16 will be connected to the fluid under pressure in auxiliary reservoir 7. Spring 17a will maintain piston 17 of switching device 15 in its same position. The open switches 47 and 50 will prevent the solenoids of relay switches 36, 36' and 36" from being energized. It is therefore apparent that the closing of switch 55 under these conditions will have no effect on the magnetic rail braking system.

When the vehicle speed decreases below a predetermined level during the quick braking operation, speed responsive switch 29 will deenergize leads 32 so that magnetic valve 11 will be deenergized and switch 33 will be opened. The deenergization of magnetic valve 11 will open conduit 12 to the atmosphere through 13 and switch 9, which is unchanged will open conduits 10 and 24 to the atmosphere through conduit 12. The pressure responsive operator 31 will open switch contacts 30 so as to deenergize the solenoids of the magnetic members 26. Since line 24 is open to the atmosphere, the fluid under pressure in the cylinders 25 will escape therefrom and the magnetic members will return to their raised positions under the action of the springs 25a. At the same time, the pressure responsive operator 48 will close switches 47 and 50. If at this time control switch 55 is closed and as a result switch 41 is closed, the magnetic valve 45 will remain deenergized because of the opening of switch 33 due to the decrease of the vehicle speed. As a result, cylindrical chamber 16 will be empty to the atmosphere. Under these conditions, switching device 15 will also remain in its same position. Even if one, or both of the switches 41' and 41" are closed by a corresponding setting of switch 56, the relay switches 36, 36" and possibly 36' will be energized by closed switches 47 and 50. However, since switch contacts 30 are open, this energization will have no effect on the magnetic braking members.

MODERATE BRAKING OF A VEHICLE MOVING AT HIGH SPEED

Under a moderate drop of pressure in the air supply line 1 the pressure responsive operator 43 will close switch 44 while switching member 9 will connect conduit 10 to the atmosphere. Speed responsive switch 29 will introduce a voltage potential across leads 32 and relay switch 33 will be closed. If under these conditions control switch 55 is closed so that transmitter 53 sends an output signal into the control leads 52 or transmitters 53' and 53" are disconnected from leads 52, only the operator will respond and close its respective switch 41. Accordingly, electrical energy will flow from lead 39 across closed switch 41, through lead 42 across closed switches 33 and 44 to energize the magnetic valve 45 so that the cylindrical chamber 16 is filled with fluid under pressure from auxiliary reservoir 7. Under the influence of pressure in chamber 16, piston 17 will move upwardly to close valve 19 and open valve 20. Fluid under pressure will then flow from chamber 23 through open valve 20 into line 24 and cylinders 25 to lower the magnetic braking members to their operating positions. As described above the solenoids of the magnetic braking members will be connected in parallel so that a very strong braking effect will be exerted on the vehicle.

If control switch 56 is now actuated to connect transmitter 53' to control leads 52, switch 41 will be closed under the action of operator 40'. The solenoids of relay switches 36 and 36" will energize through closed switch 47, lead 46 and closed switch 41'. Switch contacts 35, 35" and 37, 37" will open and switch contacts 38 and 38" will close. The solenoids of magnetic members 26 and 26" will then be disconnected from cable 34 and will be connected in series with the solenoids of magnetic members 26' and 26" which have been disconnected from their ground connection. As a result, the magnetic members 26 and 26' will be connected in series and the magnetic 26" and 26"' will be connected in series with both pairs of magnetic members being connected in parallel to cable 34. As a result of this series-parallel connection the individual magnetic members will be energized less than previously and the magnetic rail braking system will exert a decreased braking force on the vehicle.

In the event control switch 56 is actuated to connect transmitter 53' to control leads 42, then operator 40' will be actuated to close its respective switch 41. The solenoid of relay switch 36' will then be energized through closed switch 50, lead 49, and closed switch 41". Contacts 35' and 37' will be open to disconnect the solenoid of magnetic member 26' from cable 34 and to disconnect the solenoid of magnetic member 26' from its ground connection. Switch contact 38' will close and as a result, the four magnetic members will be connected in series. Thus, the magnetic members will be still less energized than above and a proportionately lower braking affect will be exerted on the vehicle.

With the control switch 56 it is possible for the operator to connect the magnetic rail braking members 26, 26', 26", and 26"' in series, series-parallel or parallel relationship to control the braking force exerted by the magnetic braking system.

If the actuation of the magnetic braking system by the operator as described above causes the speed of the vehicle to drop below a lower limit, relay switch 33 will open and magnetic valve 45 will become deenergized. Cylindrical chamber 16 of switching device 15 will then be exhausted to the atmosphere and the switching device will return to the setting as illustrated in the drawing. Conduit 14 will be connected to the atmosphere through conduit 10 and valve 9 so that fluid pressure in the solenoids 25 is released in the atmosphere. The energization of the magnetic members will be stopped by the opening of switch 30 as described above.

It is pointed out that the magnetic rail braking system can be switched off at high speeds of the vehicle merely by decreasing the braking air pressure. As a result switch 44 will be open and magnetic valve 45 will be deenergized.

In the event the vehicle operator should actuate the magnetic braking system in a manner as described above to initiate a quick braking of the vehicle, the valve 9 will respond by disconnecting conduit 10 from the atmosphere and admitting fluid under pressure into this conduit. The presence of fluid pressure in conduit 10 will actuate the pressure responsive operator 48 to open switches 47 and 50. As a result, the flow of electric current to the solenoids of relay switches 36, 36' and 36" will be interrupted independently of the setting of switches 41 and 41'. The relay switches 36, 36' and 36" will then return to the settings as shown in the drawings and the solenoids of all of the magnetic braking members will be connected in parallel to cable 34. From conduit 10 the cylindrical chamber 14 of switching device 15 will be filled with air under pressure and the piston 17 under the force of spring 17a will return the switching device to the setting as illustrated. Air line 24 will be disconnected from line 22 and will be connected to conduit 10 without interrupting the supply of compressed air to line 24. The result will be that upon the application of quick braking, the magnetic rail braking system will be automatically switched to its most effective setting.

Various modifications of the apparatus as described above may be readily made. For example, the transmitters 53, 53' and 53" can be combined into a unitary apparatus that can be switched selectively to generate different output signals. The receivers or operators 40, 40' and 40" may be combined into a unitary apparatus for closing the switches 41, 41' and 41" in response to the various output signals.

The three-step magnetic braking system as described above can be readily converted into a two-step system. This can be accomplished by removing the operator 40", switch 41" and relay 36' and by substituting therefore the switch contacts 35' and 37' of corresponding fixed cable connections controlled by relay switch 36'.

The magnetic rail braking system can also be converted into a ordinary braking arrangement which can be selectively operated from the operators control stand even when the air braking system is completely released. This may be accomplished by substituting a permanent connection for switch 44 and by removing the pressure responsive device 43.

Thus it can be seen that the present invention has provided an effective magnetic rail braking system which is selectively controlled from the operators control stand to provide varying amounts of braking force.

It will be understood that this invention is susceptible to modification in order to adapt it to different usages and conditions.

What is claimed is:

1. In a railway vehicle having both an air braking system and a magnetic rail braking system, the combination of means operatively connecting the air and magnetic braking systems for actuating said magnetic rail braking system in response to a predetermined level of effectiveness of said air braking system, means in parallel with said response actuating means for selectively controlling the braking force exerted by said magnetic rail braking system so that the operator can actuate and control the magnetic rail braking system at will, and means responsive to the actuation of the air braking system but independent of said response actuating means for actuating said magnetic rail braking system so that the magnetic rail braking system can be selectively controlled by the operator.

2. In a railway vehicle as claimed in claim 1 with the air braking system including an air supply line and a switch unit connected thereto and an auxiliary air reservoir, air actuated means connected to said magnetic rail braking system for moving the same into operating position with respect to the rail upon which the vehicle is supported, and means for connecting said air actuated means to said switch unit in one position and said air actuated means to said auxiliary reservoir in the other position.

3. In a railway vehicle as claimed in claim 2 and further comprising valve means actuated by said speed responsive means for connecting and disconnecting said control means from a source of air under pressure.

4. In a railway vehicle as claimed in claim 3 and further comprising output signal generating means operable by the operator of the vehicle, switching means responsive to said output signals and connected between a source of electrical energy and said valve means, said switching means being normally open and closed in response to said output signal to energize said valve means.

5. In a railway vehicle as claimed in claim 1 with said magnetic rail braking system comprising a plurality of magnetic braking members, output signal generating means operable by the operator of the vehicle, and electrical circuit means including relay switches for connecting said magnetic braking members in series and parallel relationship in response to said output signal.

6. In a railway vehicle as claimed in claim 5 and further comprising switching means controllable by said response actuating means for connecting said magnetic braking members in parallel when said magnetic braking system is actuated independently of said output signals.

7. In a railway vehicle as claimed in claim 3 and comprising pressure responsive switch means connected to said air braking system and actuated when the braking pressure is above a predetermined level, said switch means being connected to said valve means and rendering said valve means operable when said switch means is actuated.

References Cited

UNITED STATES PATENTS 2,124,125    7/1938    Schoepf et al. _____ 188—165 X

FOREIGN PATENTS 1,137,472    10/1962    Germany.
399,423    10/1933    Great Britain.

DUANE A. REGER, Primary Examiner

U.S. Cl. X.R.

188—165